(12) United States Patent
Akashi et al.

(10) Patent No.: US 11,667,769 B2
(45) Date of Patent: Jun. 6, 2023

(54) COMPOSITE FOR CELLULOSE FIBER DISPERSION AND CELLULOSE FIBER COMPOSITION

(71) Applicant: SHIN-NAKAMURA CHEMICAL CO., LTD., Wakayama (JP)

(72) Inventors: Ryojiro Akashi, Wakayama (JP); Takuro Nishimoto, Wakayama (JP); Toshikazu Saeki, Wakayama (JP)

(73) Assignee: SHIN-NAKAMURA CHEMICAL CO., LTD., Wakayama (JP)

( * ) Notice: Subject to any disclaimer, the term of this patent is extended or adjusted under 35 U.S.C. 154(b) by 0 days.

(21) Appl. No.: 17/474,769

(22) Filed: Sep. 14, 2021

(65) Prior Publication Data

US 2021/0403683 A1    Dec. 30, 2021

Related U.S. Application Data

(62) Division of application No. 17/050,287, filed as application No. PCT/JP2019/022293 on Jun. 5, 2019, now Pat. No. 11,149,132.

(30) Foreign Application Priority Data

Jun. 29, 2018 (JP) ................................ 2018-123997
Apr. 1, 2019 (JP) ................................ 2019-069867

(51) Int. Cl.
*C08L 1/04* (2006.01)
*C08F 251/02* (2006.01)

(52) U.S. Cl.
CPC .............. *C08L 1/04* (2013.01); *C08F 251/02* (2013.01); *C08L 2201/56* (2013.01); *C08L 2205/025* (2013.01); *C08L 2205/16* (2013.01)

(58) Field of Classification Search
None
See application file for complete search history.

(56) References Cited

U.S. PATENT DOCUMENTS

| 4,243,769 A * | 1/1981 | Pritchett | C08L 101/02 525/61 |
| 2016/0002461 A1 | 1/2016 | Tsujii et al. | |
| 2016/0208087 A1 * | 7/2016 | Virtanen | D21H 11/20 |
| 2017/0001162 A1 | 1/2017 | Imai et al. | |
| 2017/0002182 A1 | 1/2017 | Imai et al. | |
| 2018/0022908 A1 | 1/2018 | Akihama et al. | |

FOREIGN PATENT DOCUMENTS

| GB | 1 500 559 | 2/1978 |
| JP | 50-48030 | 4/1975 |
| JP | 51-82991 | 7/1976 |
| JP | 62-64837 | 3/1987 |
| JP | 2004-359840 | 12/2004 |
| JP | 2009-67817 | 4/2009 |
| JP | 2009-263417 | 11/2009 |
| JP | 2011-68707 | 4/2011 |
| JP | 2013-18851 | 1/2013 |
| JP | 2013-234283 | 11/2013 |
| JP | 5757779 | 7/2015 |
| JP | 2016-104865 | 6/2016 |
| JP | 2017-165946 | 9/2017 |
| JP | 2018-16896 | 2/2018 |
| WO | 2014/133019 | 9/2014 |
| WO | 2015/152188 | 10/2015 |
| WO | 2015/152189 | 10/2015 |

OTHER PUBLICATIONS

International Search Report dated Sep. 3, 2019 in International (PCT) Application No. PCT/JP2019/022293.
Decision to Grant a Patent dated Mar. 24, 2020 in corresponding Japanese Application No. 2019-069867, with English translation.
Notice of Reasons for Refusal dated Jan. 7, 2020 in corresponding Japanese Application No. 2019-069867, with English translation.

* cited by examiner

*Primary Examiner* — Jeffrey D Washville
(74) *Attorney, Agent, or Firm* — Wenderoth, Lind & Ponack, L.L.P.

(57) ABSTRACT

Provided are a composite for cellulose fiber dispersion that can inexpensively and sufficiently disperse cellulose fibers, particularly nanocellulose, in a hydrophobic resin and a cellulose fiber composition containing the composite. A composite for cellulose fiber dispersion according to the present invention has a structure in which a vinyl polymer is grafted to a cellulose derivative. A cellulose fiber composition according to the present invention contains the composite and cellulose fibers and more specifically also contains an organic solvent, a resin precursor, or a resin.

7 Claims, No Drawings

COMPOSITE FOR CELLULOSE FIBER DISPERSION AND CELLULOSE FIBER COMPOSITION

TECHNICAL FIELD

The present invention relates to a composite for cellulose fiber dispersion and a cellulose fiber composition containing the composite for cellulose fiber dispersion. More particularly, the present invention relates to a composite for cellulose fiber dispersion that can uniformly disperse cellulose fibers, such as cellulose nanofibers (CNF) or cellulose nanocrystals (CNC), in an organic solvent or in a resin or a precursor thereof, and a cellulose fiber composition containing the composite and cellulose fibers.

BACKGROUND ART

Cellulose has been utilized as a renewable resource in various applications, such as paper and functional materials. Nanocellulose produced by fibrillating cellulose at the nano level is attracting attention as a material with new functions.

Known nanocellulose includes cellulose nanofibers (CNF) 10 nm or less in diameter produced by chemical oxidation treatment (referred to as TEMPO-oxidized CNF or phosphorylated CNF and also referred to as single nanofibers), CNF that is produced by mechanical or physical fibrillation and has a larger diameter than those produced by chemical treatment, cellulose nanocrystals (CNC) produced by treating microfibrils or pulp with a strong acid or the like and by isolating a high-crystallinity component, and bacterial cellulose produced by microorganisms.

These materials are expected to be widely used as film materials, gas barrier materials, viscosity modifiers, lubricants, plant growth agents, thermosetting resins, radiation curable resins, such as UV- or electron-beam-curable resins, general-purpose-resin composite materials, and rubber composite materials.

One promising application of nanocellulose is a resin composite. Nanocellulose has a strength close to the strength of carbon fibers or aramid fibers. Nanocellulose is one fifth times as heavy as steel and five or more times as strong as steel. Composite materials containing nanocellulose dispersed in a resin therefore have high strength and light weight and are expected to be used as automotive materials, such as exterior materials, interior materials, and rubber belts.

Dispersion of nanocellulose in a resin and a combination of nanocellulose and a resin have been variously approached. For example, a pulp, a resin, and an optional swelling agent are mixed and are fibrillated with a kneader, or a dispersion solution of single nanoscale CNF less than 10 nm in diameter is mixed with a resin and is also fibrillated with a kneader.

It is, however, difficult by these methods to disperse these materials at the single nano-level and to achieve target physical properties.

One reason for that is that nanocellulose mostly has a hydrophilic functional group on its surface and therefore has a high affinity for water and high dispersibility in water but typically has very poor dispersibility in hydrophobic resins. In particular, although CNF produced by a TEMPO oxidation method or a phosphate treatment method has a single nano-level diameter and is useful, the CNF has a very low affinity for hydrophobic resins due to a carboxylate group or a phosphate group on its surface.

Thus, various techniques have been studied to disperse CNF in resins.

One of the techniques is a method of using a hydroxy group or the like on the surface of nanocellulose to introduce a hydrophobic functional group by a chemical reaction.

Known examples include grafting of caprolactone (see Patent Literature 1), acetylation by an addition reaction of acetic anhydride (see Patent Literature 2), and an addition reaction of an alkenylsuccinic anhydride (see Patent Literature 3).

Another known example is a method of utilizing as a dispersant an acrylic block polymer with a high affinity for both nanocellulose and a resin in which the nanocellulose is to be dispersed (see Patent Literature 4 and Patent Literature 5).

CITATION LIST

Patent Literature

PTL 1: Japanese Unexamined Patent Application Publication No. 2011-68707
PTL 2: Japanese Unexamined Patent Application Publication No. 2017-165946
PTL 3: Japanese Patent No. 5757779
PTL 4: Japanese Unexamined Patent Application Publication No. 2016-104865
PTL 5: International Publication WO 2015/152188

SUMMARY OF INVENTION

Technical Problem

Such various methods are being studied to disperse nanocellulose in hydrophobic resins.

Hydrophobization by grafting of caprolactone or by an addition reaction of acetic anhydride or the like, however, entails significantly high costs due to the necessary chemical reactions, and resins in which nanocellulose can be dispersed are limited due to insufficient hydrophobicity of a group introduced by the chemical modification.

The method of using an acrylic block polymer as a dispersant is a living radical polymerization method using an expensive catalyst and has the problem that the dispersant is expensive and has poor performance.

In the mechanical fibrillation method of a pulp, a resin, and an optional swelling agent, dispersion at the single nano-level is difficult, and the resulting composite material has poor physical properties.

Accordingly, it is an object of the present invention to provide a composite for cellulose fiber dispersion that can inexpensively and sufficiently disperse cellulose fibers, particularly nanocellulose, in a resin and to provide a cellulose fiber composition containing the composite.

Solution to Problem

To solve the above problems, the present invention includes the following aspects.

A composite for cellulose fiber dispersion according to the present invention has a structure in which a vinyl polymer is grafted to a cellulose derivative.

A cellulose fiber composition according to the present invention contains the composite and cellulose fibers.

Advantageous Effects of Invention

The present invention can provide sufficient dispersion of cellulose fibers in a resin and is therefore effective in producing a composite material of the cellulose fibers and the resin. In a composite for cellulose fiber dispersion according to the present invention, a vinyl polymer can be grafted to a cellulose derivative at a lower cost than dispersants used in the related art.

DESCRIPTION OF EMBODIMENTS

Preferred embodiments of a composite for cellulose fiber dispersion and a cellulose fiber composition according to the present invention are described in detail below. However, the scope of the present invention is not limited to these embodiments, and these embodiments may be modified without departing from the gist of the present invention.

[Composite for Cellulose Fiber Dispersion]

A composite for cellulose fiber dispersion according to the present invention (hereinafter sometimes referred to simply as a "composite") has a structure in which a vinyl polymer is grafted to a cellulose derivative.

<Cellulose Derivative>

In the cellulose derivative, the hydroxy groups of the cellulose are partly substituted. In the present invention, a cellulose derivative to which a vinyl polymer described later is grafted is referred to as a "composite" and is terminologically distinguished from the "cellulose derivative".

The cellulose derivative may be a known cellulose derivative, for example, methylcellulose, ethylcellulose, butylcellulose, hydroxypropylcellulose, hydroxypropylmethylcellulose, hydroxybutylmethylcellulose, carboxymethylcellulose, cellulose acetate, cellulose acetate butyrate, cellulose acetate propionate, cellulose triacetate, nitrocellulose, or cationic cellulose.

Among these, ethylcellulose, cellulose acetate butyrate, cellulose triacetate, and cationic cellulose are preferred in terms of solubility in organic solvents, ease with which a vinyl polymer can be grafted, and availability.

These known cellulose derivatives typically have an unmodified hydroxy group. This hydroxy group can be utilized to introduce a polymerizable unsaturated group or a thiol (mercapto) group. A polymerizable unsaturated group or a thiol group thus introduced can be used as a starting point to easily graft a vinyl polymer described later.

The polymerizable unsaturated group or the thiol group can be introduced, for example, by an addition reaction between the known cellulose derivative and an isocyanate (meth)acrylate compound, such as Karenz MOI or AOI manufactured by Showa Denko K.K., by an addition reaction of an anhydride, such as anhydrous (meth)acrylic acid or maleic anhydride, by an addition reaction of (meth)acrylic acid using a condensing agent, such as carbodiimide, or by a reaction of (meth)acryloyl chloride or an organic acid with a thiol group. Examples of organic acids with a polymerizable unsaturated double bond or with a thiol group include (meth)acrylic acid, maleic acid, crotonic acid, butene tricarboxylic acid, 4-ethenylbenzoic acid, and 3-mercaptopropionic acid.

In the present specification, the term "(meth)acrylic acid" includes both methacrylic acid and acrylic acid. The same is applied to the term "(meth)acrylate".

As in the known art, a polymerizable unsaturated group or a thiol group can be introduced using a solvent or a catalyst (an organic metallic material, an amine, etc.).

It is desirable that the number of polymerizable unsaturated groups or thiol groups to be introduced be 20 or less on average per cellulose derivative molecule. Introduction of more than 20 groups may cause gelation in graft polymerization.

The reaction solvent may be an aprotic solvent, such as ethyl acetate, propyl acetate, butyl acetate, tetrahydrofuran, dioxane, acetone, methyl ethyl ketone, methyl isobutyl ketone, toluene, xylene, dimethylformamide, dimethylacetamide, N-methylpyrrolidone, or pyridine. These solvents may be used alone or in combination.

In the present invention, the cellulose derivative may have a cationic group.

In particular, a cellulose derivative with a cationic group provides a composite with high dispersibility of CNF produced by the TEMPO oxidation method or the phosphate treatment method. This is because the CNF has a carboxylate group or a phosphate group on its surface, and a high affinity between the functional group on the CNF surface and a cationic group of the cellulose derivative promotes the dispersion of the CNF.

Although the cellulose derivative with a cationic group may be a known cationic cellulose, a cationic group may be introduced into a cellulose derivative without a cationic group, as described below.

For example, it is known that an amino group is introduced by a reaction of thionyl chloride/ammonia or by introduction of an epoxy group followed by a reaction with ammonia or a polyvalent amino compound. Another introduction method includes a reaction of a compound having both an amino group and a carboxy group in its molecule in the presence of the condensing agent described above.

The reaction solvent may be an aprotic solvent, such as ethyl acetate, propyl acetate, butyl acetate, tetrahydrofuran, dioxane, acetone, methyl ethyl ketone, methyl isobutyl ketone, toluene, xylene, dimethylformamide, dimethylacetamide, N-methylpyrrolidone, or pyridine. These solvents may be used alone or in combination.

It is desirable that the number of cationic groups be in the range of 1 to 30 on average per cellulose derivative molecule.

<Vinyl Polymer>

A vinyl polymer can be grafted to a cellulose derivative, for example, by a radical polymerization of a vinyl monomer in the presence of a cellulose derivative into which a polymerizable unsaturated group or a thiol group is introduced as described above. A graft chain composed of the vinyl polymer is formed from the polymerizable unsaturated group or the thiol group serving as a starting point.

Examples of the vinyl monomer include (meth)acrylates with an alkyl group having 1 to 20 carbon atoms, such as methyl (meth)acrylate, ethyl (meth)acrylate, propyl (meth)acrylate, butyl (meth)acrylate, isobutyl (meth)acrylate, tert-butyl (meth)acrylate, and 2-ethylhexyl (meth)acrylate, 2-hydroxyethyl (meth)acrylate, 2-hydroxypropyl (meth)acrylate, glyceryl (meth)acrylate, dimethylaminoethyl (meth)acrylate, diethylaminoethyl (meth)acrylate, tetrahydrofurfuryl (meth)acrylate, isobornyl (meth)acrylate, phenoxyethyl (meth)acrylate, benzyl (meth)acrylate, cyclohexyl (meth)acrylate, methoxy poly(ethylene glycol) (meth)acrylates with 1 to 30 repeating units, methoxy poly(propylene glycol) (meth)acrylates with 1 to 30 repeating units, butoxy diethylene glycol (meth)acrylate, 2-(meth)acryloyloxyethyl hexahydrophthalic acid, 2-(meth)acryloyloxyethyl succinic acid, glycidyl (meth)acrylate, 3,4-epoxycyclohexylmethyl methacrylate, 2-(meth)acryloyloxyethyl acid phosphate, styrene, styrene derivatives, (meth)acrylic acid, (meth)acrylamide, N-phenylmaleimide, N-cyclohexylmaleimide, maleic anhydride, (meth)acrylonitrile, N-vinylpyrrolidone, silicone (meth)acrylate (trade name Silaplane "FM-0711", "FM-0721", and "FM-0725" manufactured by JNC, "X-22-174DX", "X-22-2426", and "X-22-2475" manufactured by Shin-Etsu Chemical Co., Ltd., etc.)), and (meth)acrylates with a fluorine substituent (various fluorine substituted alkyl (meth)acrylates manufactured by Daikin Industries, Ltd., etc.).

Polyfunctional (meth)acrylates, such as ethylene glycol di(meth)acrylate and hexanediol di(meth)acrylate, and divinylbenzene may also be used, provided that they do not cause insolubilization in solvents by gelation. These monomers may be used alone or in combination.

The properties of the vinyl polymer, particularly dispersibility of cellulose fibers in an organic solvent or a resin, depend on the combination of these vinyl monomers. In general, the affinity for the dispersant organic solvent or resin is indicated by the solubility parameter (SP). It is desirable that the grafted vinyl polymer and the dispersant have similar SPs. In particular, it is desirable that the experimental or calculated difference in SP be 1.0 $((cal/cm^3)^{1/2})$ or less.

The use of a monomer with a hydroxy group, such as 2-hydroxyethyl (meth)acrylate, or a polyalkylene oxide monomer component, particularly a methoxy poly(ethylene glycol) (meth)acrylate with 1 to 30 repeating units or a methoxy poly(propylene glycol) (meth)acrylate with 1 to 30 repeating units, as a vinyl monomer is expected to have interactive effects even in the presence of an acid or base in cellulose fibers. It is therefore desirable that such a monomer be used as a component for copolymerization.

It is also desirable that a vinyl monomer to be selected have an interaction with a dispersant material (particularly a resin). The interaction may be a hydrophobic interaction of an alkyl group, a hydrogen bond of a hydroxy group, amine, carboxy group, or amide group, or a π-π conjugated stack of aromatic rings. The interaction may be produced by using a vinyl monomer with such a functional group.

It is also possible to introduce a reactive group into the vinyl polymer and form a bond with the dispersant resin. This may be achieved by copolymerization of a vinyl monomer with an epoxy group, such as glycidyl (meth)acrylate or 3,4-epoxycyclohexylmethyl (meth)acrylate. This may also be achieved by using a functional group, for example, a hydroxy group or a carboxy group, of the vinyl polymer to introduce a polymerizable (meth)acrylate group, vinyl group, or allyl group by a chemical reaction. Such a reactive group can be introduced by an addition reaction using a (meth)acrylate with an isocyanate group, Karenz MOI-I or AO-I (manufactured by Showa Denko K.K.), glycidyl (meth)acrylate, or 3,4-epoxycyclohexylmethyl (meth)acrylate.

The weight ratio of the cellulose derivative into which a polymerizable unsaturated group or a thiol group is introduced to the vinyl monomer in polymerization preferably ranges from 1:99 to 90:10. A weight ratio outside this range may result in poor dispersant effects on cellulose fibers.

In the polymerization, all the vinyl polymer produced from the vinyl monomer is not necessarily grafted (chemically bonded) to the cellulose derivative. A polymer produced by homopolymerization of the vinyl monomer may be contained.

The vinyl polymer grafted to the cellulose derivative preferably has a weight-average molecular weight in the range of 1000 to 500,000. A weight-average molecular weight of less than 1000 may result in poor dispersant effects, and a weight-average molecular weight of more than 500,000 tends to result in excessively high viscosity.

The weight-average molecular weights of the cellulose derivative, the vinyl polymer to be grafted to the cellulose derivative, and a composite thereof are measured by gel permeation chromatography (GPC) based on polystyrene standards.

The composite of the cellulose derivative and the vinyl polymer (the composition for cellulose fiber dispersion) preferably has a weight-average molecular weight in the range of 5000 to 800,000. This weight-average molecular weight is characteristic of a combination of a vinyl polymer bonded to the cellulose derivative, a bonded polymer, and a vinyl polymer not bonded to the cellulose derivative (homopolymer).

The molecular weight of the composite measured by GPC is sometimes different from the simple sum total of the molecular weight of the cellulose derivative and the molecular weight of the vinyl polymer possibly due to the solution characteristics inherent in the cellulose derivative. Although details are unknown, the bonding of the vinyl polymer to the cellulose derivative may change the expansion of the polymer chain or the interaction of the cellulose derivative. Thus, this is just the molecular weight measured by GPC.

Suitable examples of organic solvents for use in the polymerization include ethyl acetate, butyl acetate, tetrahydrofuran, dioxane, acetone, methyl ethyl ketone, methyl isobutyl ketone, toluene, xylene, ethyl alcohol, isopropyl alcohol, butyl alcohol, benzyl alcohol, dimethylformamide, dimethylacetamide, N-methylpyrrolidone, ethyl lactate, ethylene glycol monoethyl ether, ethylene glycol monobutyl ether, ethylene glycol monomethyl ether acetate, ethylene glycol monoethyl ether acetate, ethylene glycol monobutyl ether acetate (butyl carbitol acetate), diethylene glycol monoethyl ether, diethylene glycol monobutyl ether, diethylene glycol monoethyl ether acetate, diethylene glycol monobutyl ether acetate, diethylene glycol ethyl methyl ether, diethylene glycol isopropyl methyl ether, diethylene glycol diethyl ether, diethylene glycol butyl methyl ether, diethylene glycol dibutyl ether, triethylene glycol dimethyl ether, triethylene glycol butyl methyl ether, propylene glycol monomethyl ether, propylene glycol monomethyl ether acetate, propylene glycol dimethyl ether, propylene glycol diacetate, dipropylene glycol monomethyl ether, dipropylene glycol dimethyl ether, dipropylene glycol monobutyl ether, dipropylene glycol dibutyl ether, tripropylene glycol dimethyl ether, dihydroterpineol acetate, terpineol, dihydroterpineol, and dihydroterpineol acetate. These organic solvents may be used alone or in combination.

A polymerization initiator, for example, a peroxide or azo radical polymerization initiator may be used. The concentration in the polymerization and the initiator concentration may be within the scope of known technology.

After polymerization of the vinyl monomer on the cellulose derivative, if necessary, purification by precipitation in a poor solvent may be performed in the same manner as in existing polymer purification. Unreacted monomers, by-products, and vinyl homopolymers may be removed.

[Cellulose Fiber Composition]

A cellulose fiber composition according to the present invention is described below.

A cellulose fiber composition according to the present invention (hereinafter sometimes referred to simply as a "composition") contains the composite described in detail above and cellulose fibers.

A specific embodiment may depend on the application. First to third embodiments are exemplified as preferred embodiments.

First Embodiment: Organic Solvent Dispersion Composition

A composition according to the first embodiment of the present invention contains the composite, cellulose fibers, and an organic solvent.

Cellulose fibers, such as nanocellulose, and the composite can be mixed at a predetermined concentration, and an organic solvent can be added to the mixture to prepare a homogeneous dispersion solution.

Cellulose fibers dispersed in a water medium are available as commercial products of CNF or CNC. For example, substitution with an organic solvent in such a commercial product used as a raw material can produce a composition containing cellulose fibers dispersed in the organic solvent. The organic solvent can be removed from such a composition after application or forming to produce a powder, film, or structure containing cellulose fibers at a high concentration. Such a composition can also be used as a thickener or as a raw material for dispersing cellulose fibers in a resin.

In an embodiment containing cellulose fibers and the composite from which the organic solvent is removed, the composite functions as both a dispersant and a binder. This can improve water resistance, improve mechanical strength, and provide redispersibility in an organic solvent, as compared with known structures composed only of cellulose fibers, such as CNF.

Cellulose fibers available as commercial products or samples include cellulose fibers 4 to 500 nm in diameter, such as slurry CNF manufactured by Oji Holdings Corporation (phosphorylated product, name: Aurovisco), powder CNF, TEMPO-oxidized CNF manufactured by Nippon Paper Industries Co., Ltd., Nanoforest-S manufactured by Chuetsu Pulp & Paper Co., Ltd., water-dispersed CNF manufactured by Daio Paper Corporation (name: ELLEX-S), and TEMPO-oxidized water-dispersed CNF manufactured by Dai-ichi Kogyo Seiyaku Co., Ltd. (name: Rheocrysta).

The organic solvent may be a solvent used in the reaction or polymerization or a lower alcohol, such as methanol.

One example of a method of dispersion in the organic solvent includes mixing water-dispersible cellulose fibers, the composite, and the organic solvent and then evaporating water by heating or in a vacuum. Temporary and complete removal of water or the organic solvent causes strong aggregation of cellulose fibers and makes redispersion difficult. In a desirable process, therefore, a small amount of the organic solvent is left, and the concentration is adjusted using the organic solvent.

The weight ratio of the cellulose fibers to the composite preferably ranges from 1:0.01 to 1:10, particularly preferably 1:0.05 to 1:2. Above this upper limit, the dispersibility and characteristics may deteriorate. The weight of the organic solvent is preferably 5 to 200 times the weight of (the cellulose fibers+the composite).

Although the composition is produced by substitution with an organic solvent in a starting material, water-dispersible cellulose fibers, the starting material may be a pulp.

The pulp may be made of a raw material such as softwood, hardwood, kenaf, or bamboo. The pulp may be made by different treatment methods, for example, chemical pulp, mechanical pulp, chemical mechanical pulp, or semi-chemical pulp.

A mixture of a pulp, the composite, and an organic solvent can be mechanically fibrillated with a mechanical mixer, such as a homogenizer, a kneader, or a continuous twin-screw kneader to prepare a cellulose fiber composition. The amount of each component in the mixture is described above. The fiber diameter in the mechanical fibrillation method tends to be larger than the fiber diameter in the chemically treated water-dispersed cellulose used as a starting material.

The composition according to the first embodiment can be widely used as a raw material for inks, adhesives, compound materials, and various components.

Second Embodiment: Resin Precursor Dispersion Composition

A composition according to the second embodiment of the present invention contains the composite, cellulose fibers, and a resin precursor.

The composition according to the second embodiment can be prepared in the same manner as the composition according to the first embodiment.

The resin precursor can form a polymeric material by a polymerization reaction and may be a (meth)acrylate compound, a vinyl compound, an allyl compound, an acid anhydride, an amine compound, an isocyanate compound, an epoxy compound, or a reactive silicone compound.

Among these, a (meth)acrylate compound, a vinyl compound, or an epoxy compound is particularly preferred in terms of reactivity and versatility.

Examples of the (meth)acrylate compound include monofunctional (meth)acrylate compounds, such as C1 to C30 alkyl (meth)acrylate compounds, methoxyethylene oxide (meth)acrylate compounds, bisphenol A (meth)acrylate compounds, and aromatic (meth)acrylate compounds, bifunctional (meth)acrylate compounds, such as ethylene glycol di(meth)acrylate compounds, propylene glycol di(meth)acrylate compounds, bisphenol A di(meth)acrylate compounds, fluorene di(meth)acrylate compounds, and tricyclodecane di(meth)acrylate compounds, and polyfunctional (meth)acrylate compounds, such as glycerin (meth)acrylate compounds, (mono-, di-, tri-)trimethylolpropane (meth)acrylate compounds, polyfunctional isocyanurate (meth)acrylate compounds, and polyfunctional (mono-, di-, tri-)pentaerythritol (meth)acrylate compounds.

Examples of the vinyl compound include divinylbenzene, styrene, styrene derivatives, vinylnaphthalene, and acrylonitrile.

Examples of the epoxy compound include bisphenol A epoxy compounds, bisphenol F epoxy compounds, bisphenol S epoxy compounds, novolak phenolic epoxy compounds, resole phenolic epoxy compounds, naphthalene epoxy compounds, biphenyl epoxy compounds, and hydrogenated compounds thereof, polyfunctional isocyanurate glycidyl ether compounds, polyfunctional polybutadiene glycidyl ether compounds, polyfunctional glycidyl amide compounds, polyfunctional glycidyl ester compounds, and polyfunctional alicyclic epoxy compounds, and monofunctional epoxy compounds serving as reactive diluents.

Examples of the reactive silicone compound include various RTV silicone rubbers and silicones for liquid injection molding (LIM) manufactured by Shin-Etsu Chemical Co., Ltd. In addition, two-component condensation, addition, UV-curing RTV silicone rubbers and silicone materials for LIM may also be used.

The weight ratio of the cellulose fibers to the composite preferably ranges from 1:0.01 to 1:10, as described above. Above this upper limit, the dispersibility and characteristics may deteriorate. The weight of the resin precursor is preferably 5 to 100 times the weight of (the cellulose fibers+the composite). When a (meth)acrylate compound is used, a polymerization inhibitor, such as hydroquinone, may be added to improve storage stability, as in the related art.

The production method may be a substitution method using an aqueous dispersion as a raw material or a mechanical fibrillation method starting from a pulp, as described above.

The composition according to the second embodiment can be widely used as a raw material for UV-curing materials, thermosetting materials, adhesives, compound materials, and various components.

Third Embodiment: Resin Dispersion Composition

A composition according to the third embodiment of the present invention contains the composite, cellulose fibers, and a resin.

Examples of the resin include various acrylic resins, polystyrene, acrylonitrile-styrene resins, acrylonitrile-butadiene-styrene resins, various polycarbonates, polyethylene, polypropylene, poly(vinyl chloride), poly(vinylidene chloride), nitrile rubbers, butadiene rubbers, poly(styrene-butadiene), polyisoprene, ethylene-propylene-dien rubbers, various polyesters, various polyurethanes, various nylon resins (polyamides), polyacetal, poly(vinyl acetal), such as poly(vinyl butyral), cellulose resins, such as ethylcellulose, cellulose acetate butyrate, and cellulose acetate, poly(phenylene oxide), poly(phenylene sulfide), phenolic resins, silicone resins, and fluoropolymers.

The composition according to the third embodiment may be produced by several methods.

For example, the composite is mixed with the cellulose fibers (and optional water or organic solvent), and the mixture is mixed with the resin and is mechanically kneaded and fibrillated with a kneader or a continuous twin-screw kneader, if necessary, while heating.

In another method, one of the resins soluble in an organic solvent is dissolved in a dispersion liquid composed of the composite, the cellulose fibers, and the organic solvent (the composition according to the first embodiment) to prepare a solution containing uniformly dispersed cellulose fibers, and the organic solvent is removed from the solution.

These methods are preferably used depending on the type of resin to be used.

The weight ratio of the cellulose fibers to the composite preferably ranges from 1:0.01 to 1:10, as described above. Above this upper limit, the dispersibility and characteristics may deteriorate. The weight of the resin is preferably 5 to 100 times the weight of (the cellulose fibers+the composite).

The third composition can be used as an amorphous substance or as an amorphous substance containing an organic solvent and as a raw material for various applications. The third composition can be used for various components as a structure formed by thermoforming or machining. The third composition can also be used as a film formed by coating or melt forming.

<Optional Components in Composition according to Present Invention>

A composition according to the present invention may contain various materials other than the composite, cellulose fibers, organic solvent, resin precursor, and resin.

Examples of the various materials include a surfactant, a plasticizer, a viscosity modifier, an antifoaming agent, a leveling agent, a stabilizer, such as a UV absorber or an antioxidant, a pigment, polymer particles, inorganic particles, such as metal particles or ceramic particles, an epoxy curing agent, a curing catalyst, and a polymerization initiator. The weight of these materials may range from 0.001% to 90% of the weight of the composition.

EXAMPLES

Examples and comparative examples of a composite for cellulose fiber dispersion and a cellulose fiber composition according to the present invention are described below. However, the present invention is not limited to these examples.

[Synthesis of Reactive Cellulose Derivative]

Synthesis Example 1

100 parts by weight of ethylcellulose ("Ethocel STD-4" manufactured by The Dow Chemical Company, number-average molecular weight: 13,700) and 400 parts by weight of ethyl acetate were mixed in a reaction vessel to prepare a solution containing the ethylcellulose homogeneously dissolved in the ethyl acetate.

The solution was mixed with 2.82 parts by weight of a condensing agent diisopropylcarbodiimide, 0.05 parts by weight of a reaction accelerator dimethylaminopyridine, and 1.92 parts by weight of methacrylic acid. The solution was then allowed to react while stirring at 40° C. for 24 hours to introduce a methacrylate group into the ethylcellulose.

The progress of the reaction could be checked by measuring the acid value and was completed by stirring at 40° C. for 24 hours as described above. A sample was taken, dried, and subjected to $^1$H-NMR analysis, which showed that the same number of moles of methacrylate groups as the methacrylic acid were introduced into the ethylcellulose. The number of introduced methacrylate groups was three on average per ethylcellulose chain.

Synthesis Example 2

100 parts by weight of ethylcellulose ("Ethocel STD-4" manufactured by The Dow Chemical Company, number-average molecular weight: 13,700) and 400 parts by weight of ethyl acetate were mixed in a reaction vessel to prepare a solution containing the ethylcellulose homogeneously dissolved in the ethyl acetate.

The solution was mixed with 4.59 parts by weight of a condensing agent diisopropylcarbodiimide, 0.09 parts by weight of a reaction accelerator dimethylaminopyridine, and 3.13 parts by weight of methacrylic acid. The solution was then allowed to react while stirring at 40° C. for 24 hours to introduce a methacrylate group into the ethylcellulose.

The progress of the reaction could be checked by measuring the acid value and was completed by stirring at 40° C. for 24 hours as described above. A sample was taken, dried, and subjected to $^1$H-NMR analysis, which showed that the same number of moles of methacrylate groups as the methacrylic acid were introduced into the ethylcellulose. The number of introduced methacrylate groups was five on average per ethylcellulose chain.

Synthesis Example 3

100 parts by weight of ethylcellulose ("Ethocel STD-10" manufactured by The Dow Chemical Company, number-average molecular weight: 22,800) and 400 parts by weight of ethyl acetate were mixed in a reaction vessel to prepare a solution containing the ethylcellulose homogeneously dissolved in the ethyl acetate.

The solution was mixed with 1.67 parts by weight of a condensing agent diisopropylcarbodiimide, 0.03 parts by weight of a reaction accelerator dimethylaminopyridine, and 1.14 parts by weight of methacrylic acid. The solution was then allowed to react while stirring at 40° C. for 24 hours to introduce a methacrylate group into the ethylcellulose.

The progress of the reaction could be checked by measuring the acid value and was completed by stirring at 40° C. for 24 hours as described above. A sample was taken, dried, and subjected to $^1$H-NMR analysis, which showed that the same number of moles of methacrylate groups as the methacrylic acid were introduced into the ethylcellulose. The number of introduced methacrylate groups was three on average per ethylcellulose chain.

Synthesis Example 4

100 parts by weight of ethylcellulose ("Ethocel STD-4" manufactured by The Dow Chemical Company, number-average molecular weight: 13,700) and 400 parts by weight of ethyl acetate were mixed in a reaction vessel to prepare a solution containing the ethylcellulose homogeneously dissolved in the ethyl acetate.

The solution was mixed with 4.59 parts by weight of a condensing agent diisopropylcarbodiimide, 0.09 parts by weight of a reaction accelerator dimethylaminopyridine, and 3.86 parts by weight of 3-mercaptopropionic acid. The solution was then allowed to react while stirring at 40° C. for 24 hours to introduce a thiol group into the ethylcellulose.

The progress of the reaction could be checked by measuring the acid value and was completed by stirring at 40° C. for 24 hours as described above. A sample was taken, dried, and subjected to $^1$H-NMR analysis, which showed that the same number of moles of mercapto (thiol) groups as the 3-mercaptopropionic acid were introduced into the ethylcellulose. The number of introduced thiol groups was five on average per ethylcellulose chain.

Synthesis Example 5

100 parts by weight of ethylcellulose ("Ethocel STD-4" manufactured by The Dow Chemical Company, number-average molecular weight: 13,700) and 900 parts by weight of ethyl acetate were mixed in a reaction vessel to prepare a solution containing the ethylcellulose homogeneously dissolved in the ethyl acetate. A molecular sieve was added for dehydration to remove as much water as possible.

3.40 parts of 2-isocyanatoethyl methacrylate ("Karenz MOI" manufactured by Showa Denko K.K.) and 0.01 parts of a catalyst dioctyltin dilaurate were added to the solution. The solution was allowed to react at a temperature of 60° C. for 5 hours while stirring to introduce a methacrylate group into the ethylcellulose.

A sample was taken, dried, and subjected to $^1$H-NMR analysis, which showed that the same number of moles of methacrylate groups as the 2-isocyanatoethyl methacrylate were introduced into the ethylcellulose. The number of introduced methacrylate groups was three on average per ethylcellulose chain.

Synthesis Example 6

100 parts by weight of ethylcellulose ("Ethocel STD-20" manufactured by The Dow Chemical Company, number-average molecular weight: 39,000) and 900 parts by weight of ethyl acetate were mixed in a reaction vessel to prepare a solution containing the ethylcellulose homogeneously dissolved in the ethyl acetate. A molecular sieve was added for dehydration to remove as much water as possible.

1.99 parts of 2-isocyanatoethyl methacrylate ("Karenz MOI" manufactured by Showa Denko K.K.) and 0.01 parts of a catalyst dioctyltin dilaurate were added to the solution. The solution was allowed to react at a temperature of 60° C. for 5 hours while stirring to introduce a methacrylate group into the ethylcellulose.

A sample was taken, dried, and subjected to $^1$H-NMR analysis, which showed that the same number of moles of methacrylate groups as the 2-isocyanatoethyl methacrylate were introduced into the ethylcellulose. The number of introduced methacrylate groups was five on average per ethylcellulose chain.

Synthesis Example 7

100 parts by weight of ethylcellulose ("Ethocel STD-100" manufactured by The Dow Chemical Company, number-average molecular weight: 63,000) and 900 parts by weight of ethyl acetate were mixed in a reaction vessel to prepare a solution containing the ethylcellulose homogeneously dissolved in the ethyl acetate. A molecular sieve was added for dehydration to remove as much water as possible.

0.73 parts of 2-isocyanatoethyl methacrylate ("Karenz MOI" manufactured by Showa Denko K.K.) and 0.01 parts of a catalyst dioctyltin dilaurate were added to the solution. The solution was allowed to react at a temperature of 60° C. for 5 hours while stirring to introduce a methacrylate group into the ethylcellulose.

A sample was taken, dried, and subjected to $^1$H-NMR analysis, which showed that the same number of moles of methacrylate groups as the 2-isocyanatoethyl methacrylate were introduced into the ethylcellulose. The number of introduced methacrylate groups was three on average per ethylcellulose chain.

Synthesis Example 8

100 parts by weight of cellulose acetate butyrate (CAB, "CAB-555-04" manufactured by Eastman Kodak Company, number-average molecular weight: 20,000) and 400 parts by weight of ethyl acetate were mixed in a reaction vessel to prepare a solution containing the CAB homogeneously dissolved in the ethyl acetate.

The solution was mixed with 3.16 parts by weight of a condensing agent diisopropylcarbodiimide, 0.031 parts by weight of a reaction accelerator dimethylaminopyridine, and 2.15 parts by weight of methacrylic acid. The solution was then allowed to react while stirring at 40° C. for 24 hours to introduce a methacrylate group into the CAB.

The progress of the reaction could be checked by measuring the acid value and was completed by stirring at 40° C. for 24 hours as described above. A sample was taken, dried, and subjected to $^1$H-NMR analysis, which showed that the same number of moles of methacrylate groups as the methacrylic acid were introduced into the CAB. The number of introduced methacrylate groups was five on average per CAB chain.

Synthesis Example 9

100 parts by weight of cellulose triacetate (TAC, "L-20" manufactured by Daicel Chemical Industries, Ltd., degree of acetylation: 55%, number-average molecular weight: 31,000) and 400 parts by weight of ethyl acetate were mixed in a reaction vessel to prepare a solution containing the TAC homogeneously dissolved in the ethyl acetate.

The solution was mixed with 1.22 parts by weight of a condensing agent diisopropylcarbodiimide, 0.012 parts by weight of a reaction accelerator dimethylaminopyridine, and 0.83 parts by weight of methacrylic acid. The solution was then allowed to react while stirring at 40° C. for 24 hours to introduce a methacrylate group into the TAC.

The progress of the reaction could be checked by measuring the acid value and was completed by stirring at 40° C. for 24 hours as described above. A sample was taken, dried, and subjected to $^1$H-NMR analysis, which showed that the same number of moles of methacrylate groups as the methacrylic acid were introduced into the TAC. The number of introduced methacrylate groups was five on average per TAC chain.

Synthesis Example 10

100 parts by weight of the cellulose derivative synthesized in the synthesis example 1 and 400 parts by weight of ethyl acetate were mixed in a reaction vessel to prepare a homogeneous solution.

The solution was mixed with 2.82 parts by weight of a condensing agent diisopropylcarbodiimide, 0.05 parts by weight of a reaction accelerator dimethylaminopyridine, and 4.31 parts by weight of 4-diethylaminobenzoic acid. The solution was then allowed to react while stirring at 40° C. for 24 hours to introduce an amino group. Titrimetry showed that the same number of amino groups as the charge were introduced.

[Synthesis of Composite]

Example 1

15 parts by weight of the cellulose derivative synthesized in the synthesis example 1 was dissolved in 170 parts by weight of ethyl acetate in a reaction vessel while stirring (the concentration of a polymer component after the reaction was adjusted with ethyl acetate to be 15% to 30% by weight of the total amount of the cellulose derivative and the vinyl monomer). 15 parts by weight of butyl methacrylate and 0.6 parts by weight of a polymerization initiator azoisobutyronitrile (AIBN) were added to the solution. After the reaction vessel was filled with nitrogen gas, a polymerization reaction was performed at 80° C. for 8 hours.

Examples 2 to 22

Composites were synthesized in the same manner as in Example 1 except that the type of cellulose derivative, the vinyl monomer composition, and the ratio of the cellulose derivative to the vinyl monomer were changed as listed in Table 1.

TABLE 1

| Composite | Cellulose derivative type | Vinyl monomer composition | Cellulose derivative/vinyl monomer (weight ratio) | Mn | Mw |
|---|---|---|---|---|---|
| Example 1 | Synthesis example 1 | BMA | 1/1 | 10000 | 296000 |
| Example 2 | Synthesis example 1 | LMA | 1/1 | 11000 | 301000 |
| Example 3 | Synthesis example 1 | BMA/MMA = 8/2 | 1/1 | 9800 | 290000 |
| Example 4 | Synthesis example 1 | BMA | 1/3 | 5200 | 51000 |
| Example 5 | Synthesis example 1 | BMA/HEMA = 7/3 | 1/3 | 5600 | 62000 |
| Example 6 | Synthesis example 1 | BMA/M-40G = 8/2 | 1/3 | 5500 | 57000 |
| Example 7 | Synthesis example 1 | MMA | 3/1 | 38000 | 260000 |
| Example 8 | Synthesis example 1 | BMA | 1/5 | 4400 | 49000 |
| Example 9 | Synthesis example 1 | BMA/GMA = 8/2 | 3/1 | 5500 | 56000 |
| Example 10 | Synthesis example 2 | BMA | 1/1 | 9300 | 310000 |
| Example 11 | Synthesis example 2 | MMA/HEMA = 7/3 | 1/9 | 3600 | 37000 |
| Example 12 | Synthesis example 3 | BMA | 1/1 | 10500 | 294000 |
| Example 13 | Synthesis example 3 | BMA/HEMA = 7/3 | 1/3 | 6000 | 65000 |
| Example 14 | Synthesis example 4 | BMA | 1/1 | 11000 | 241000 |
| Example 15 | Synthesis example 5 | BMA | 1/3 | 5400 | 52000 |
| Example 16 | Synthesis example 5 | BMA/MMA = 8/2 | 1/1 | 21000 | 325000 |
| Example 17 | Synthesis example 6 | BMA | 1/1 | 11000 | 300000 |
| Example 18 | Synthesis example 7 | BMA | 1/1 | 20000 | 330000 |
| Example 19 | Synthesis example 7 | BMA/HEMA = 8/2 | 1/3 | 7300 | 76000 |
| Example 20 | Synthesis example 8 | BMA/MMA = 8/2 | 1/1 | 16000 | 250000 |
| Example 21 | Synthesis example 9 | BMA/MMA = 8/2 | 1/1 | 19000 | 282000 |
| Example 22 | Synthesis example 10 | BMA | 3/1 | 41000 | 256000 |

The vinyl monomers listed in Table 1 are described in detail below.

BMA: butyl methacrylate
LMA: lauryl methacrylate
MMA: methyl methacrylate
M-40G: methoxytetraethylene glycol monomethacrylate manufactured by Shin Nakamura Chemical Co., Ltd.
HEMA: 2-hydroxyethyl methacrylate
GMA: glycidyl methacrylate The number-average molecular weight (Mn) and weight-average molecular weight (Mw) of the composites listed in Table 1 were measured under the following conditions.

GPC apparatus: "HLC-8320GPC" manufactured by Tosoh Corporation,
Column: TSKgel GMHXL,
Measurement temperature (set temperature): 40° C.,
Mobile phase: tetrahydrofuran

Comparative Example 1

For comparative evaluation, a vinyl polymer without the cellulose derivative was synthesized.

More specifically, 30 parts by weight of butyl methacrylate, 70 parts by weight of ethyl acetate, and 0.6 parts by weight of a polymerization initiator azoisobutyronitrile (AIBN) were added. After the reaction vessel was filled with nitrogen gas, a polymerization reaction was performed at 80° C. for 8 hours. A poly(butyl methacrylate) with a weight-average molecular weight of 200,000 was produced.

Examples of Organic Solvent Dispersion Composition

Example 1A 50 parts by weight of TEMPO-oxidized CNF (an aqueous dispersion with a CNF solid content of 2% by weight: manufactured by Dai-ichi Kogyo Seiyaku Co., Ltd.), 0.5 parts by weight (solid content) of the composite produced in Example 4 (cellulose derivative-vinyl polymer composite) (added as an ethyl acetate solution), and 50 parts by weight of dipropylene glycol monomethyl ether (DPM) in a glass flask container were mixed in a high-speed agitator for 15 minutes. The mixture was then dehydrated under reduced pressure with a rotatory evaporator. A liquid containing the CNF dispersed in the DPM at a concentration of 2% by weight was produced.

Dispersibility was evaluated by the organoleptic evaluation of the transparency and viscosity of the solution and the sedimentation of CNF and was rated as good, fair, and poor. Table 2 shows the results.

except that the organic solvent and other factors were changed. In Examples 9A and 10A, non-TEMPO-oxidized Nanoforest-S manufactured by Chuetsu Pulp & Paper Co., Ltd. was used as CNF. Table 2 shows the details and evaluation results.

Comparative Example 1A

A vinyl polymer without the cellulose derivative produced in Comparative Example 1 was used alone at a polymer solid content corresponding to 50% by weight of CNF in the water-dispersed CNF. Dispersibility in DPM was examined in the same manner as in Example 1A. Table 2 shows the results. The CNF aggregated.

Comparative Example 2A

An amount of ethylcellulose ("Ethocel STD-4" manufactured by The Dow Chemical Company) corresponding to 50% by weight of CNF in the water-dispersed CNF was added. Dispersibility in DPM was examined in the same manner as in Example 1A. Table 2 shows the results. The CNF aggregated.

TABLE 2

| | Cellulose fibers | | Composite | | Organic solvent | | |
|---|---|---|---|---|---|---|---|
| | type | parts by weight | type | parts by weight (solid) | type | parts by weight | Dispersibility |
| Example 1A | CNF1 | 50 | Example 4 | 0.5 | DPM | 50 | Good |
| Example 2A | CNF1 | 50 | Example 4 | 0.5 | Xylene | 50 | Good |
| Example 3A | CNF1 | 50 | Example 4 | 0.5 | BCA | 50 | Good |
| Example 4A | CNF1 | 50 | Example 4 | 0.5 | Butyl acetate | 50 | Good |
| Example 5A | CNF1 | 50 | Example 1 | 0.1 | DPM | 50 | Fair |
| Example 6A | CNF1 | 50 | Example 1 | 2 | DPM | 50 | Good |
| Example 7A | CNF1 | 50 | Example 1 | 1 | DPM | 50 | Good |
| Example 8A | CNF1 | 50 | Example 1 | 10 | DPM | 50 | Fair |
| Example 9A | CNF2 | 20 | Example 1 | 1 | DPM | 50 | Good |
| Example 10A | CNF2 | 20 | Example 4 | 1 | BCA | 50 | Good |
| Example 11A | CNF1 | 50 | Example 8 | 0.5 | DPM | 50 | Good |
| Example 12A | CNF1 | 50 | Example 7 | 0.5 | DPM | 50 | Good |
| Example 13A | CNF1 | 50 | Example 10 | 0.5 | DPM | 50 | Good |
| Example 14A | CNF1 | 50 | Example 12 | 0.5 | DPM | 50 | Good |
| Comparative example 1A | CNF1 | 50 | Comparative example 1 | 0.5 | DPM | 50 | Poor |
| Comparative example 2A | CNF1 | 50 | STD-4 | 0.5 | DPM | 50 | Poor |

The raw materials listed in Table 2 are described in detail below.

CNF1: cellulose nanofibers manufactured by Dai-ichi Kogyo Seiyaku Co., Ltd. (Rheocrysta/2% by weight aqueous dispersion)

CNF2: Nanoforest-S (10% by weight aqueous dispersion) manufactured by Chuetsu Pulp & Paper Co., Ltd.

STD-4: ethylcellulose manufactured by The Dow Chemical Company "Ethocel STD-4"

DPM: dipropylene glycol monomethyl ether

BCA: diethylene glycol monobutyl ether acetate

The composite was used as an ethyl acetate solution with 10% by weight of an active ingredient.

Examples 2a to 14A

Compositions containing CNF dispersed in an organic solvent were produced in the same manner as in Example 1A Examples of Resin Precursor Dispersion Composition Example 1B 50 parts by weight of TEMPO-oxidized CNF (an aqueous dispersion with a CNF solid content of 2% by weight: manufactured by Dai-ichi Kogyo Seiyaku Co., Ltd.), 0.5 parts by weight (solid content) of the composite produced in Example 4, and 50 parts by weight of tricyclodecane dimethanol diacrylate (A-DCP) in a glass flask container were mixed in a high-speed agitator for 15 minutes. The mixture was then dehydrated under reduced pressure with a rotatory evaporator. A CNF dispersion liquid containing the CNF dispersed in the A-DCP was produced.

Dispersibility was evaluated by the organoleptic evaluation of the transparency of the solution and the sedimentation of CNF and was rated as good, fair, and poor. Table 3 shows the results.

TABLE 3

| | Cellulose fibers parts by weight | Composite type | Composite parts by weight (solid) | Resin precursor type | Resin precursor parts by weight | Dispersibility |
|---|---|---|---|---|---|---|
| Example 1B | 50 | Example 4 | 0.5 | A-DCP | 50 | Good |
| Example 2B | 50 | Example 4 | 0.5 | A-9300 | 50 | Good |
| Example 3B | 50 | Example 4 | 0.5 | AD-TMP | 50 | Good |
| Example 4B | 50 | Example 4 | 0.5 | A-DPH | 50 | Good |
| Example 5B | 50 | Example 1 | 0.1 | A-DCP | 50 | Fair |
| Example 6B | 50 | Example 1 | 2 | A-DCP | 50 | Good |
| Example 7B | 50 | Example 1 | 0.1 | A-DCP | 50 | Good |
| Example 8B | 50 | Example 1 | 10 | A-DCP | 50 | Fair |
| Example 9B | 50 | Example 1 | 0.5 | A-DCP | 50 | Good |
| Example 10B | 50 | Example 8 | 0.5 | A-DCP | 50 | Good |
| Example 11B | 50 | Example 2 | 0.5 | A-DCP | 50 | Good |
| Example 12B | 50 | Example 3 | 0.5 | A-DCP | 50 | Good |
| Example 13B | 50 | Example 5 | 0.5 | A-DCP | 50 | Good |
| Example 14B | 50 | Example 6 | 0.5 | A-DCP | 50 | Good |
| Example 15B | 50 | Example 7 | 0.5 | A-DCP | 50 | Good |
| Example 16B | 50 | Example 9 | 0.5 | JER-828 | 50 | Good |
| Example 17B | 50 | Example 9 | 0.5 | JER-807 | 50 | Good |
| Example 18B | 50 | Example 10 | 0.5 | A-DCP | 50 | Good |
| Example 19B | 50 | Example 12 | 0.5 | A-DCP | 50 | Good |
| Example 20B | 50 | Example 11 | 0.5 | A-DCP | 50 | Good |
| Example 21B | 50 | Example 13 | 0.5 | A-DCP | 50 | Good |
| Example 22B | 50 | Example 14 | 0.5 | A-DCP | 50 | Good |
| Example 23B | 50 | Example 15 | 0.5 | A-DCP | 50 | Good |
| Example 24B | 50 | Example 17 | 0.5 | A-DCP | 50 | Good |
| Example 25B | 50 | Example 18 | 0.5 | A-DCP | 50 | Good |
| Example 26B | 50 | Example 20 | 0.5 | A-DCP | 50 | Good |
| Example 27B | 50 | Example 21 | 0.5 | A-DCP | 50 | Good |
| Example 28B | 50 | Example 22 | 0.5 | A-DCP | 50 | Good |
| Comparative example 1B | 50 | Comparative example 1 | 0.5 | A-DCP | 50 | Poor |
| Comparative example 2B | 50 | STD-4 | 0.5 | A-DCP | 50 | Poor |

The raw materials listed in Table 3 are described in detail below.

STD-4: ethylcellulose manufactured by The Dow Chemical Company "Ethocel STD-4"

A-DCP: tricyclodecane dimethanol diacrylate (manufactured by Shin Nakamura Chemical Co., Ltd.)

A-9300: ethoxylated isocyanurate triacrylate

AD-TMP: ditrimethylolpropane tetraacrylate

A-DPH: dipentaerythritol hexaacrylate

JER-828: bifunctional bisphenol A epoxy (manufactured by Mitsubishi Chemical Corporation)

JER-807: bifunctional bisphenol F epoxy (manufactured by Mitsubishi Chemical Corporation)

The composite was used as an ethyl acetate solution with 10% by weight of an active ingredient.

The cellulose fibers in the examples and comparative examples in Table 3 were of the same type and were cellulose nanofibers manufactured by Dai-ichi Kogyo Seiyaku Co., Ltd. (Rheocrysta/2% by weight aqueous dispersion).

Examples 2B to 28B

Resin precursor compositions containing dispersed CNF were produced in the same manner as in Example 1B except that the resin precursor and other factors were changed. Table 3 shows the details and evaluation results.

Comparative Example 1B

A vinyl polymer without the cellulose derivative produced in Comparative Example 1 was used alone at a polymer solid content corresponding to 50% by weight of CNF in the water-dispersed CNF. Dispersibility in A-DCP was examined in the same manner as in the examples. Table 3 shows the results. The CNF aggregated.

Comparative Example 2B

An amount of ethylcellulose (STD-4) corresponding to 50% by weight of CNF in the water-dispersed CNF was added. Dispersibility in A-DCP was examined in the same manner as in the examples. Table 3 shows the results. The CNF aggregated.

Examples of Resin Dispersion Composition

Example 1C

The organic solvent dispersion composition containing CNF dispersed in xylene according to Example 2A was used to produce a resin composite composition of Example 1C.

More specifically, the composition of Example 2A (CNF solid content 2% by weight) was used as a raw material. 10 g of the composition (CNF dispersion liquid), 15 g of a poly(methyl methacrylate) (PMMA) resin (an in-house product with a weight-average molecular weight Mw of 550,000), and 40 g of toluene were mixed in a high-speed agitator while stirring. The composition was then applied with a wire bar to a releasable poly(ethylene terephthalate) film and was dried to form a film 100 μm in thickness.

The film of Example 1C was transparent and contained uniformly dispersed CNF.

The tensile strength of the film was measured with a tensile tester (AG-10N) manufactured by Shimadzu Corporation.

The PMMA film containing dispersed CNF and a PMMA film (20 μm) without dispersed CNF produced by the same method were used as samples.

The tensile strength was 56 MPa in the film containing CNF (1.5% by weight of the resin) and 50 MPa in the PMMA film without CNF. Thus, the tensile strength was improved by 10% or more.

Example 2C

The resin precursor dispersion composition containing CNF dispersed in A-DCP according to Example 1B was used to produce a film of Example 2C.

More specifically, 100 parts by weight of the resin precursor composition of Example 1B (CNF content: 2% by weight of the resin precursor) was mixed with 50 parts by weight of A-400 (bifunctional oligoethylene glycol monomer) manufactured by Shin Nakamura Chemical Co., Ltd. and was further mixed with 4.5 parts by weight of a photoinitiator Irgacure TPO.

The composition was applied to a releasable poly(ethylene terephthalate) film and was cured with a UV irradiation apparatus equipped with a high-pressure mercury light source at an integral light energy of 1000 mJ to form a transparent film approximately 100 μm in thickness.

In the same manner as in Example 1C, the tensile strength of the film was measured with a tensile tester (AG-10N) manufactured by Shimadzu Corporation.

A control film sample was formed in the same manner as in Example 2C except that CNF was not used.

The tensile strength was 50 MPa in the sample with CNF (1.5% by weight of the resin) and 40 MPa in the sample without CNF. Thus, the breaking strength was improved by 20% or more.

Example 3C

The resin precursor dispersion composition containing CNF dispersed in the bisphenol A epoxy resin according to Example 16B was used to produce a film of Example 3C.

More specifically, 100 parts by weight of the resin precursor composition of Example 16B (CNF content: 2% by weight of the resin precursor) was mixed with 20 parts by weight of a curing agent isophorone diamine. The composition was applied to a releasable poly(ethylene terephthalate) film with a blade coater and was cured at 100° C. for 1 hour to form a transparent film approximately 100 μm in thickness according to Example 3C.

In the same manner as in Example 1C, the tensile strength of the film was measured with a tensile tester (AG-10N) manufactured by Shimadzu Corporation.

A control film sample was formed in the same manner as in Example 3C except that CNF was not used.

The tensile strength was 80 MPa in the sample with CNF (1.5% by weight of the resin) and 65 MPa in the sample without CNF. Thus, the breaking strength was improved by 20% or more.

Example 4C 20 parts by weight of a pulp, 1000 parts by weight of a high-density polyethylene resin, and 6 parts by weight (solid content) of the composite (dispersant) produced in Example 1 were mixed. After the organic solvent was removed, the mixture was kneaded in a continuous twin-screw kneader at 190° C. to produce a polyethylene composite material containing dispersed cellulose fibers. The material was formed into a film 100 μm in thickness by hot pressing. The film was almost transparent.

In the same manner as in Example 1C, the tensile strength of the film was measured with a tensile tester (AG-10N) manufactured by Shimadzu Corporation.

A control film sample was formed in the same manner as in Example 4C except that CNF was not used.

The tensile strength was 40 MPa in the film containing CNF (2% by weight of the resin) and 30 MPa in the film without CNF. Thus, the tensile strength was improved by 30% or more.

The invention claimed is:

1. A nanocellulose dispersion liquid composition comprising:
   a composite for nanocellulose dispersion,
   nanocellulose having a diameter of 500 nm or less, and
   a resin solution,
      the composite having a structure in which a vinyl polymer is grafted to a reactive cellulose derivative into which 20 or less polymerizable unsaturated groups and/or thiol groups on average per molecule of the cellulose derivative are introduced by utilizing an unmodified hydroxy group of the cellulose derivative, the polymerizable unsaturated groups and/or thiol groups serving as starting points,
      wherein a weight ratio of the nanocellulose to the composite ranges from 1:0.01 to 1:10, and
      wherein the cellulose derivative is at least one selected from the group consisting of methylcellulose, ethylcellulose, butylcellulose, hydroxypropylcellulose, hydroxypropylmethylcellulose, hydroxybutylmethylcellulose, carboxymethylcellulose, cellulose acetate, cellulose acetate butyrate, cellulose acetate propionate, cellulose triacetate, nitrocellulose, and cationic cellulose.

2. The nanocellulose dispersion liquid composition according to claim 1, wherein
   the cellulose derivative is at least one selected from the group consisting of ethylcellulose, cellulose acetate butyrate, cellulose acetate propionate, cellulose triacetate, and cationic cellulose.

3. The nanocellulose dispersion liquid composition according to claim 1, wherein
   the nanocellulose is cellulose nanofibers.

4. The nanocellulose dispersion liquid composition according to claim 3, wherein
   the cellulose nanofibers are cellulose nanofibers having a single nano-level diameter and having a carboxylate group and/or phosphate group on their surfaces.

5. The nanocellulose dispersion liquid composition according to claim 4, comprising:
   a monomer component with a hydroxy group and/or a polyalkylene oxide monomer component as a monomer component constituting the vinyl polymer.

6. The nanocellulose dispersion liquid composition according to claim 4, wherein
   the cellulose derivative has a cationic group.

7. The nanocellulose dispersion liquid composition according to claim 6, wherein
   the cellulose derivative has 1 to 30 cationic groups on average per molecule of the cellulose derivative.

\* \* \* \* \*